US010278072B2

(12) United States Patent
Takeuchi et al.

(10) Patent No.: US 10,278,072 B2
(45) Date of Patent: Apr. 30, 2019

(54) COMMUNICATION DEVICE AND TERMINAL DEVICE

(71) Applicant: BROTHER KOGYO KABUSHIKI KAISHA, Nagoya-shi, Aichi (JP)

(72) Inventors: Shun Takeuchi, Nagoya (JP); Hirotaka Asakura, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/712,639

(22) Filed: Sep. 22, 2017

(65) Prior Publication Data
US 2018/0098217 A1    Apr. 5, 2018

(30) Foreign Application Priority Data

Sep. 30, 2016 (JP) ................. 2016-194533

(51) Int. Cl.
*H04L 9/32* (2006.01)
*H04W 4/80* (2018.01)
(Continued)

(52) U.S. Cl.
CPC ............ *H04W 12/06* (2013.01); *G06F 21/31* (2013.01); *G06F 21/43* (2013.01); *H04L 9/3226* (2013.01);
(Continued)

(58) Field of Classification Search
CPC ....... H04W 12/06; H04W 4/80; H04W 88/02; H04M 1/72522; H04M 1/7253; G06F 21/31; G06F 21/43; H04L 9/3226
(Continued)

(56) References Cited

U.S. PATENT DOCUMENTS 7,133,659 B2 * 11/2006 Zalewski ............... G06Q 10/02
455/403
8,249,499 B2 * 8/2012 Waung .................. H04W 88/04
455/7
(Continued)

FOREIGN PATENT DOCUMENTS

JP    2009-069548 A    4/2009
JP    2014-530410 A    11/2014
(Continued)

OTHER PUBLICATIONS

2010 Wi-Fi Alliance, Wi-Fi Peer-to-Peer (P2P) Technical Specification Version 1.1.

*Primary Examiner* — William Nealon
(74) *Attorney, Agent, or Firm* — Scully, Scott, Murphy & Presser, PC

(57) ABSTRACT

A communication device may supply connection information to a first wireless interface so as to store the connection information in an interface memory, establish a wireless connection via a second wireless interface with a terminal device by using the connection information after the connection information has been sent to the terminal device, execute a first authentication using first authentication information in a case where the first authentication information is received from the terminal device, send a first registration instruction to the terminal device by using the wireless connection via the second wireless interface in a case where the first authentication is successful, and execute a second authentication using the first authentication information in a case where the first authentication information which has been registered in the terminal device is received from the terminal device after the first registration instruction has been sent to the terminal device.

7 Claims, 8 Drawing Sheets

(51) Int. Cl.
*G06F 21/31* (2013.01)
*H04W 12/06* (2009.01)
*G06F 21/43* (2013.01)
*H04M 1/725* (2006.01)
*H04W 76/10* (2018.01)
*H04W 88/02* (2009.01)

(52) U.S. Cl.
CPC ..... *H04M 1/7253* (2013.01); *H04M 1/72522* (2013.01); *H04W 4/80* (2018.02); *H04W 76/10* (2018.02); *H04L 2209/805* (2013.01); *H04W 88/02* (2013.01)

(58) Field of Classification Search
USPC .......................................................... 455/411
See application file for complete search history.

(56) References Cited

U.S. PATENT DOCUMENTS

| | | | |
|---|---|---|---|
| 8,321,922 B1 | 11/2012 | Lo et al. | |
| 9,363,251 B2* | 6/2016 | Morikuni | H04L 63/08 |
| 2008/0090520 A1* | 4/2008 | Camp | H04B 5/00 |
| | | | 455/41.2 |
| 2013/0074170 A1* | 3/2013 | Lo | G06F 21/43 |
| | | | 726/7 |
| 2013/0260683 A1 | 10/2013 | Suzuki et al. | |
| 2014/0026202 A1 | 1/2014 | Lo et al. | |

FOREIGN PATENT DOCUMENTS

| | | |
|---|---|---|
| JP | 2015-069458 A | 4/2015 |
| JP | 2015-103162 A | 6/2015 |
| WO | WO 2013/039601 A1 | 3/2013 |

\* cited by examiner

FIG. 1 Communication System 2

(Case B)

(Case C)

COMMUNICATION DEVICE AND TERMINAL DEVICE

TECHNICAL FIELD

The present disclosure discloses a communication device and a terminal device capable of performing a short distance wireless communication.

BACKGROUND ART

An electronic device and a computing system capable of performing an NFC (abbreviation of Near Field Communication) communication are known. When an NFC link with the computing system is established, the electronic device reads out a user name and a password, and sends them to the computing system by using the NFC link. The computing system executes an authentication by using the user name and the password received from the electronic device.

SUMMARY

In the technique described above, no consideration is given to registering the user name and the password in the electronic device. In the present disclosure, a technique is disclosed that allows authentication information to be appropriately registered in a mobile terminal.

A communication device disclosed in the present disclosure may comprise a first wireless interface comprising an interface memory; a second wireless interface different from the first wireless interface, wherein a distance with which a wireless communication can be performed via the second wireless interface is longer than a distance with which a wireless communication can be performed via the first wireless interface; a processor; and a memory storing computer-readable instructions therein, the computer-readable instructions, when executed by the processor, causing the communication device to: supply connection information to the first wireless interface so as to store the connection information in the interface memory, the connection information being for establishing a wireless connection via the second wireless interface, wherein the first wireless interface is configured to send the connection information in the interface memory to a terminal device by using a communication session in a case where the communication session with the terminal device is established; establish the wireless connection via the second wireless interface with the terminal device by using the connection information after the connection information has been sent to the terminal device; execute a first authentication using first authentication information in a case where the first authentication information is received from the terminal device by using the wireless connection via the second wireless interface due to the wireless connection via the second wireless interface being established and the first authentication information being inputted to the terminal device; send a first registration instruction to the terminal device by using the wireless connection via the second wireless interface in a case where the first authentication using the first authentication information is successful, the first registration instruction being for registering the first authentication information in the terminal device as authentication information which is to be used by the communication device to execute an authentication; and execute a second authentication using the first authentication information in a case where the first authentication information which has been registered in the terminal device is received from the terminal device after the first registration instruction has been sent to the terminal device.

The present disclosure further discloses a non-transitory computer-readable recording medium storing computer-readable instructions for a terminal device, wherein the computer-readable instructions, when executed by a processor of the terminal device, may cause the terminal device to: determine whether first authentication information which is to be used by a communication device to execute an authentication is registered in the terminal device, in a case where a communication session with the communication device is established via a first wireless interface of the terminal device; send the first authentication information to the communication device via the first wireless interface so as to cause the communication device to execute an authentication using the first authentication information, in a case where it is determined that the first authentication information is registered in the terminal device; establish a wireless connection with the communication device via a second wireless interface of the terminal device, in a case where it is determined that the first authentication information is not registered in the terminal device, a distance with which a wireless communication can be performed via the second wireless interface being longer than a distance with which a wireless communication can be performed via the first wireless interface; send second authentication information to the communication device by using the wireless connection via the second wireless interface so as to cause the communication device to execute an authentication using the second authentication information, in a case where the wireless connection via the second wireless interface is established and the second authentication information is inputted to the terminal device; receive a registration instruction by using the wireless connection via the second wireless interface from the communication device in a case where the authentication using the second authentication information is successful; and register the second authentication information as authentication information which is to be used by the communication device to execute an authentication, in a case where the registration instruction is received from the communication device.

A control method, computer-readable instructions, and a non-transitory computer-readable recording medium storing the computer-readable instructions, for implementation of the aforementioned communication device are also novel and useful. The terminal device itself which is realized by the computer-readable instructions and a control method thereof are also novel and useful. Further, a communication system which comprises the aforementioned communication device and terminal device is also novel and useful.

BRIEF DESCRIPTION OF THE DRAWINGS

EMBODIMENTS (Configuration of Communication System 2; FIG. 1)

As shown in FIG. 1, a communication system 2 comprises a multi-function peripheral 10 (called "MFP" below) and a mobile terminal 100. Each of the devices 10, 100 is capable of performing a wireless communication according to a Wi-Fi system (called "Wi-Fi communication" below) and a wireless communication according to the NFC (abbreviation of Near Field Communication) standard (called "NFC communication" below).

(Configuration of MFP 10)

Figure 1:
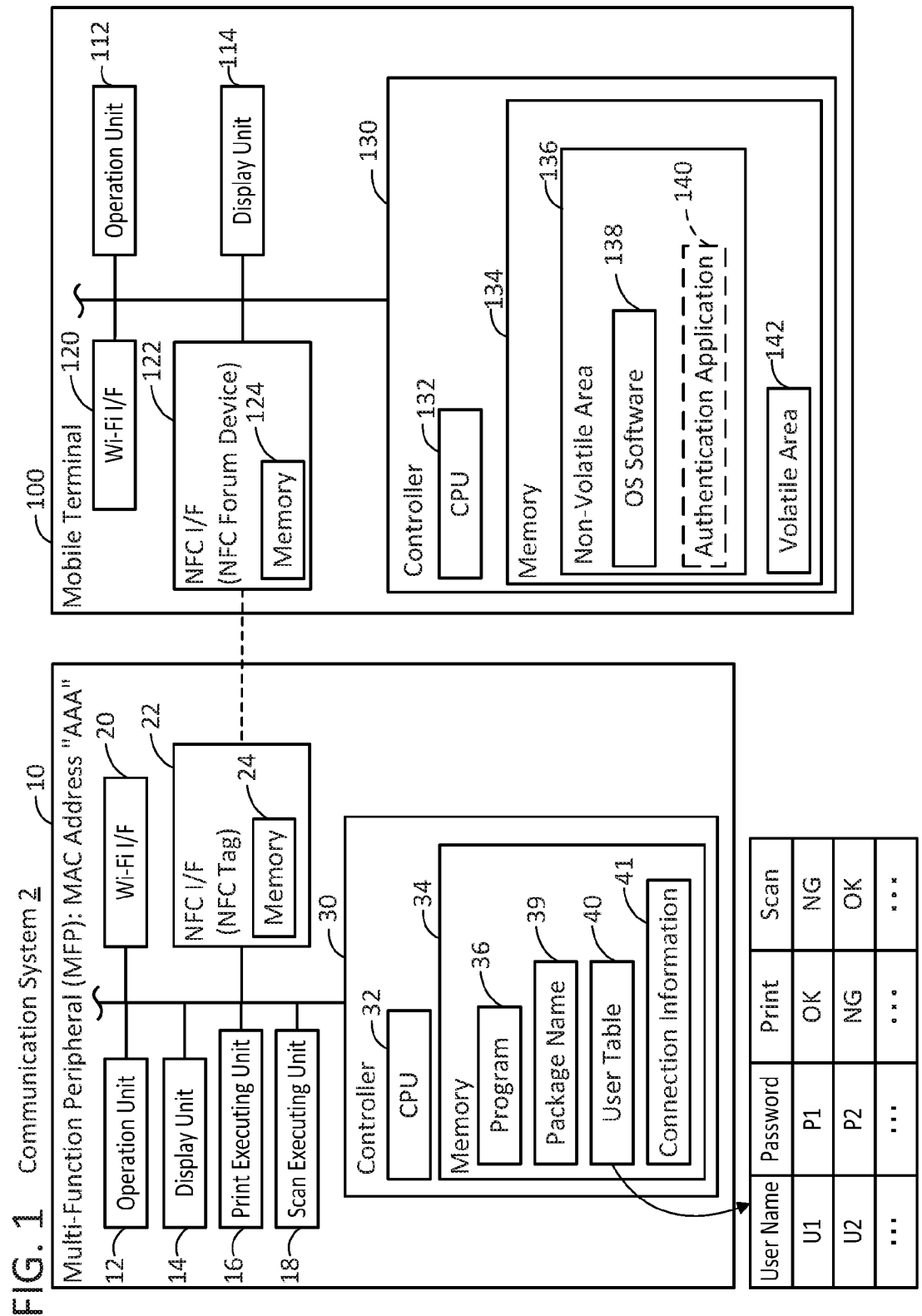
FIG. 1 shows a configuration of a communication system.

The MFP 10 comprises an operation unit 12, a display unit 14, a print executing unit 16, a scan executing unit 18, a Wi-Fi I/F 20, an NFC I/F 22, and a controller 30.

The operation unit 12 comprises a plurality of keys. A user can input various instructions to the MFP 10 by operating the operation unit 12. The display unit 14 is a display for displaying various information. The display unit 14 also functions as a so-called touch panel. That is, the display unit 14 also functions as an operation unit. Therefore, below, the operation unit 12 and the display unit 14 may collectively be termed "operation units 12, 14". The print executing unit 16 comprises a printing mechanism such as an ink jet scheme, a laser scheme, or the like. The scan executing unit 18 comprises a scanning mechanism such as a CCD, a CIS, or the like.

The Wi-Fi I/F 20 is a wireless interface for executing the Wi-Fi communication according to the Wi-Fi system. The Wi-Fi system is a wireless communication system for executing a wireless communication according to the standard of e.g., IEEE (abbreviation of The Institute of Electrical and Electronics Engineers, Inc.) standard 802.11 and standards conforming thereto (e.g., 802.11a, 11b, 11g, 11n, etc.). The Wi-Fi I/F 20, in particular, supports the WFD (abbreviation of Wi-Fi Direct (registered trademark)) system developed by the Wi-Fi Alliance and is capable of executing a wireless communication in accordance with the WFD system (called "WFD communication" below). The WFD system is a wireless communication system described in the standard document "Wi-Fi Peer-to-Peer (P2P) Technical Specification Version1.1" created by the Wi-Fi Alliance. Further, U.S. Patent Application Publication No. 2013/0260683 also discloses details of the WFD system, the contents of which are cited as reference herein.

The NFC I/F 22 is an I/F for executing the NFC communication. The NFC system is a wireless communication system based on international standards such as e.g., ISO/IEC14443, 15693, 18092. It should be noted that an I/F called an NFC forum device and an I/F called an NFC tag are known as types of I/F for executing the NFC communication. The NFC forum device is an I/F capable of selectively operating in any of a P2P (abbreviation of Peer To Peer) mode, an R/W (abbreviation of Reader/Writer) mode, and a CE (abbreviation of Card Emulation) mode. The NFC tag is not an I/F capable of selectively operating in any of these modes, but functions as an IC (abbreviation of Integrated Circuit) tag of the NFC system.

The P2P mode is a mode for performing a bidirectional communication between one NFC apparatus operating in the P2P mode and another NFC apparatus operating in the P2P mode. The R/W mode and the CE mode are modes for performing a unidirectional communication between one NFC apparatus operating in the R/W mode and another NFC apparatus operating in the CE mode. It should be noted that the CE mode may be a CE mode requiring a secure element, or an HCE (abbreviation of Host Card Emulation) mode not requiring a secure element. A Reader mode in the R/W mode is a mode for reading out data from an NFC apparatus operating in the CE mode. A Writer mode in the R/W mode is a mode for writing data to an NFC apparatus operating in the CE mode. It should be noted that an NFC apparatus operating in the R/W mode can read out data from an NFC tag and write data to the NFC tag.

The NFC I/F 22 is an NFC tag. Since an NFC tag is cheaper than an NFC forum device, a manufacturing cost of the MFP 10 can be reduced. In a case of receiving a polling signal from a partner device and sending a response signal for the polling signal to the partner device, the NFC I/F 22 establishes an NFC session with the partner device. The NFC I/F 22 comprises a memory 24.

Here, differences between the Wi-Fi communication and the NFC communication will be described. A communication speed of the Wi-Fi communication (e.g., maximum communication speed is 11 to 600 Mbps) is faster than a communication speed of the NFC communication (e.g., maximum communication speed is 100 to 424 Kbps). Further, a frequency of a carrier wave in the Wi-Fi communication (e.g. a 2.4 GHz band or 5.0 GHz band) is different from a frequency of a carrier wave in the NFC communication (e.g. a 13.56 MHz band). Further, a maximum distance with which the Wi-Fi communication can be executed (e.g., approximately 100 m at maximum) is longer than a maximum distance with which the NFC communication can be executed (e.g., approximately 10 cm at maximum).

The controller 30 comprises a CPU 32 and a memory 34. The CPU 32 executes various processes in accordance with a program 36 stored in the memory 34. The memory 34 is constituted of a volatile memory, a non-volatile memory, and the like. Further, the memory 34 stores a package name 39, a user table 40, and connection information 41. The package name 39 is a package name of an authentication application 140 to be installed in the mobile terminal 100. The package name is a name obtained by arranging a domain in its reverse order, such as "com.example.android.beam".

A user name, a password, print permission information and scan permission information are associated with each other in the user table 40. The user name, the password, the print permission information and the scan permission information are registered in the user table 40 by, e.g., an administrator of the MFP 10 operating the operation units 12, 14. The print permission information and the scan permission information respectively indicate whether or not a printing function and a scanning function are permitted to the user. In each of the permission information, "OK" indicates that a use of its corresponding function is permitted, and "NG" indicates that use of the corresponding function is not permitted. It should be noted, in a modification, the user table 40 may be stored in a memory of an external device different from the MFP 10. In this case, the MFP 10 can communicate with the external device to use the information in the user table 40.

In the present embodiment, since the user name and the password are used for authentication, the user name and the password are registered in the user table 40 as information used for authentication. Therefore, an amount of information to be stored in the memory 34 is reduced compared to a configuration in which, in addition to the user name and the password, authentication information different from the user name and the password is registered in the user table 40. Further, in the present embodiment, a generic authentication method is adopted such as an AD (abbreviation of Active Directory) authentication, or an LDAP (Lightweight Directory Access Protocol) authentication using the user name and the password.

The connection information 41 is information for establishing a wireless connection in accordance with the WFD system (called "WFD connection" below) with another device (e.g., the mobile terminal 100), and includes an SSID (abbreviation of Service Set Identifier), an authentication method, an encryption method, and a password. The SSID is an identifier for identifying a WFD network. The authentication method, the encryption method, and the password are information used in authentication and encryption executed in the WFD network. When power is turned ON, the MFP 10 autonomously shifts to a G/O (abbreviation of Group Owner) state of the WFD system, and forms the WFD network in which the connection information 41 is to be used. In a modification, instead of shifting to the G/O state of the WFD system, the MFP 10 may activate a so-called Soft AP (abbreviation of Access Point) and operate as a parent station of a wireless network. In this case, the connection information 41 includes information for establishing a wireless connection according to the Soft AP with another device.

(Configuration of Mobile Terminal 100)

The mobile terminal 100 is a portable terminal device such as a mobile telephone, a smartphone, a PDA, a notebook PC, a tablet PC, a portable music playback device or a portable movie playback device. The mobile terminal 100 comprises an operation unit 112, a display unit 114, a Wi-Fi I/F 120, an NFC I/F 122, and a controller 130.

The operation unit 112 comprises a plurality of keys. The user can input various instructions to the mobile terminal 100 by operating the operation unit 112. The display unit 114 is a display for displaying various information. The display unit 114 also functions as a so-called touch panel. That is, the display unit 114 also functions as an operation unit. Therefore, below, the operation unit 112 and the display unit 114 may collectively be termed "operation units 112, 114". The Wi-Fi I/F 120 is same as the Wi-Fi I/F 20 of the MFP 10. The NFC I/F 122 is an NFC forum device and comprises a memory 124.

The controller 130 comprises a CPU 132 and a memory 134. The CPU 132 executes various processes in accordance with an OS software 138 stored in the memory 134. The OS software 138 is software for controlling various basic operations of the mobile terminal 100.

The memory 134 comprises a non-volatile area 136 and a volatile area 142. The OS software 138 is stored in the non-volatile area 136. The authentication application 140 may further be stored in the non-volatile area 136. The authentication application 140 is an application for causing the MFP 10 to execute an authentication using the user name and the password. The authentication application 140 is provided by a vendor of the MFP 10 and is installed in the mobile terminal 100 from, e.g., a server on the Internet. The volatile area 142 stores information acquired or generated during the CPU 132 executing processes.

Figure 2:
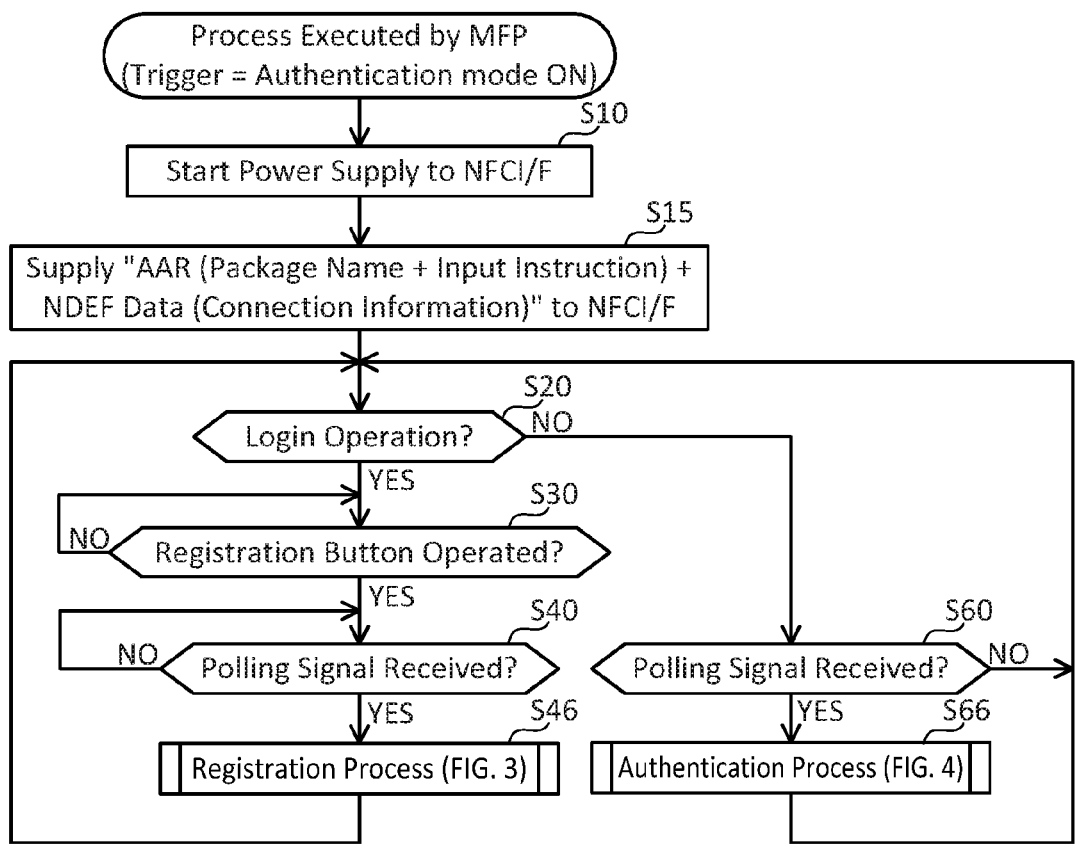
FIG. 2 shows a flowchart of a process executed by a multi-function peripheral.

(Process Executed by MFP 10; FIG. 2)

Next, a process executed by the CPU 32 of the MFP 10 will be described with reference to FIG. 2. The process of FIG. 2 is started when an operation for changing a setting of an authentication mode from OFF to ON is performed in the operation units 12, 14. The authentication mode is an operation mode for executing a registration of the user name and the password in the mobile terminal 100 or for executing an authentication using the user name and the password.

In S10, the CPU 32 starts power supply to the NFC I/F 22. As a result, the NFC I/F 22 can receive a polling signal and send a response signal for the polling signal.

In S15, the CPU 32 supplies both an AAR (abbreviation of "Android Application Record") including the package name 39 and an input instruction, and NDEF (abbreviation of "NFC Data Exchange Format") data including the connection information 41, to the NFC I/F 22, and stores both the AAR and the NDEF data in the memory 24. The AAR is an activation instruction for activating the authentication application 140 specified by the package name 39. The input instruction is an instruction for causing display of an input screen for inputting the user name and the password. It should be noted, in a modification, the AAR may include, instead of the package name 39, a URL (abbreviation of Uniform Resource Locator) indicating a location of the authentication application 140 on the Internet.

In S20, the CPU 32 monitors whether a login operation is performed on the operation units 12, 14 by the user. In a case where a combination of the user name and the password registered in the user table 40 is inputted in the operation units 12, 14, the CPU 32 determines YES in S20, and proceeds to S30.

In S30, the CPU 32 monitors whether a registration button for registering the user name and the password in the mobile terminal 100 is operated. In a case where the registration button is operated in the operation units 12, 14 (YES in S30), the CPU 32 proceeds to S40. It should be noted, although not shown, in a case where a button different from the registration button (e.g., a scan start button) is operated, the CPU 32 executes a process corresponding to the different button (e.g., a scan process).

In S40, the CPU 32 monitors whether the NFC I/F 22 receives a polling signal from the mobile terminal 100. When the user moves the mobile terminal 100 provided with the NFC I/F 122 which is operating in the R/W mode closer to the MFP 10, a distance between the mobile terminal 100 and the NFC I/F 22 becomes smaller than the maximum distance with which the NFC communication can be executed (e.g., 10 cm). In this case, the NFC I/F 22 receives the polling signal from the mobile terminal 100, and sends a response signal to the mobile terminal 100. Thereby, an NFC session is established between the NFC I/F 22 and the mobile terminal 100. In a case where the NFC session with the mobile terminal 100 is established, the NFC I/F 22 supplies information indicating that the NFC session has been established to the controller 30. In a case of acquiring the information from the NFC I/F 22, the CPU 32 determines YES in S40, and executes a registration process of FIG. 3 in S46. When S46 ends, the process returns to S20.

S60 is the same as S40. In a case of determining YES in S60, in S66, the CPU 32 executes an authentication process of FIG. 4. In a case of determining NO in S60, or in a case where S66 ends, the process returns to S20. It should be noted, although not shown, when an operation for changing the setting of the authentication mode from ON to OFF is executed in the operation units 12, 14, the process of FIG. 2 ends.

Figure 3:
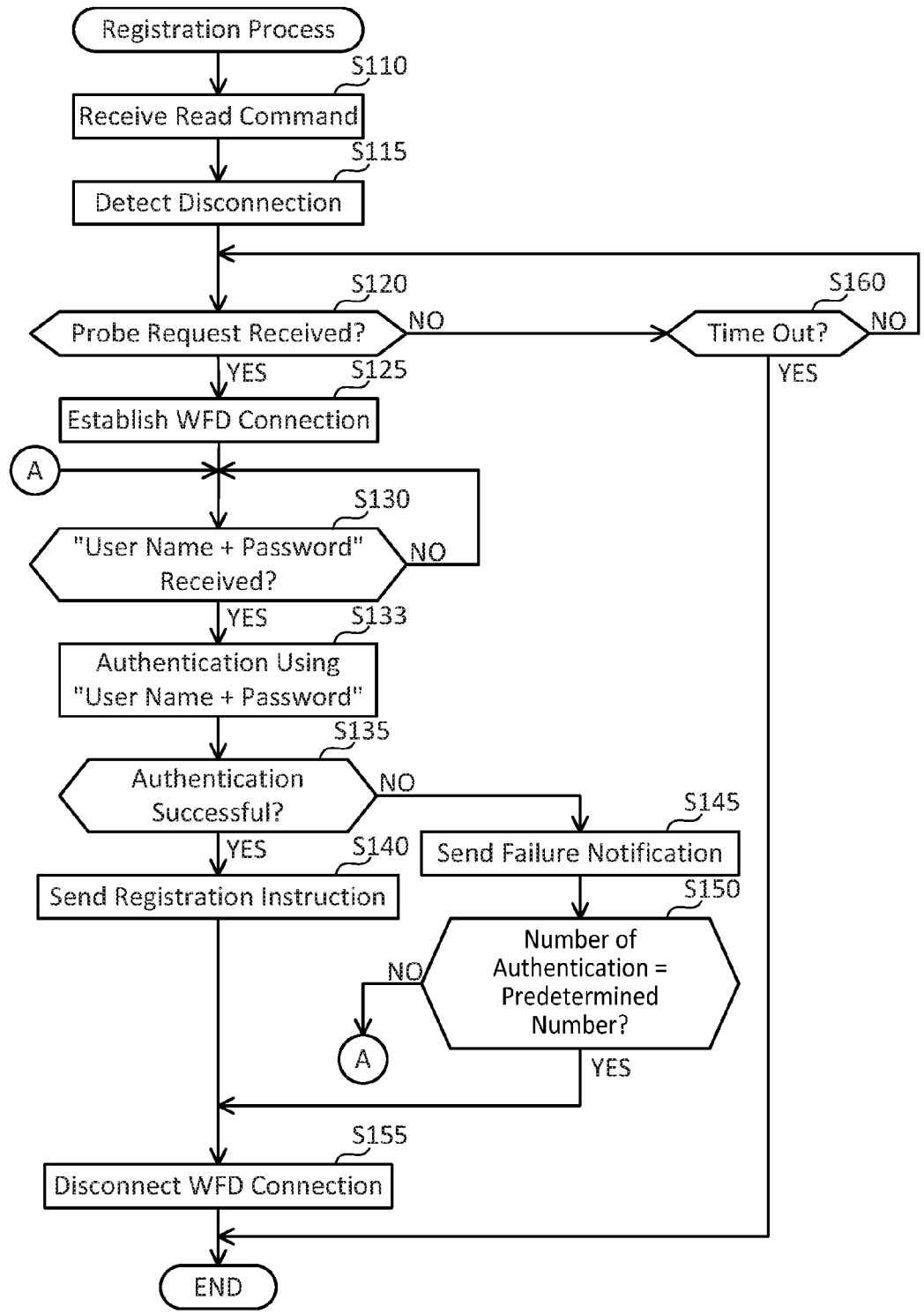
FIG. 3 shows a flowchart of a registration process.

(Registration Process; FIG. 3)

Next, the registration process executed in S46 of FIG. 2 will be described with reference to FIG. 3. In S110, the CPU 32 receives a read command from the mobile terminal 100 via the NFC I/F 22 by using the NFC session established in S40 of FIG. 2. The read command is a confirmation signal for confirming whether it is possible to execute a readout of information (i.e., whether the NFC I/F 22 is capable of sending information). In a case of receiving the read command from the mobile terminal 100, the NFC I/F 22 sends an OK command for the read command. Then, by using the NFC session, the NFC I/F 22 sends both the AAR and the NDEF data in the memory 24 to the mobile terminal 100. The NFC I/F 22 further supplies the read command to the controller 30. By acquiring the read command from the NFC I/F 22 (i.e., by executing the process of S110), the CPU 32 can confirm that both the AAR and the NDEF data have been sent to the mobile terminal 100. The NFC I/F 22 further supplies the read command to the controller 30. By acquiring the read command from the NFC I/F 22 (i.e., by executing the process of S110), the CPU 32 can confirm that both the AAR and the NDEF data have been sent to the mobile terminal 100. When the AAR is sent to the mobile terminal 100, it is possible to execute, in the mobile terminal 100, an activation of the authentication application 140 (see S330 of FIG. 5) and processes using the authentication application 140 (see S335 to S345 of FIG. 5, S405 to S445 of FIG. 6).

In S115, the CPU 32 detects a disconnection of the NFC session with the mobile terminal 100. For example, when the user moves the mobile terminal 100 away from the MFP 10, the distance between the mobile terminal 100 and the NFC I/F 22 of the MFP 10 becomes longer than the maximum distance with which the NFC communication can be executed, and consequently the NFC session is disconnected. In this case, the NFC I/F 22 supplies information indicating that the NFC session has been disconnected to the controller 30.

In S120, the CPU 32 monitors whether a probe request including the SSID in the connection information 41 is received from the mobile terminal 100 via the Wi-Fi I/F 20. In a case of receiving the probe request (YES in S120), the CPU 32 proceeds to S125.

In S125, the CPU 32 establishes the WFD connection with the mobile terminal 100 via the Wi-Fi I/F 20. Specifically, the CPU 32 performs communications of various signals including a probe response, a Provision Discovery signal, an Authentication signal, an Association signal, WSC Exchange, 4-Way Handshake, and the like with the mobile terminal 100 via the Wi-Fi I/F 20. During the communications of these signals, the CPU 32 receives the SSID, the authentication method, the encryption method, and the password within the connection information 41 from the mobile terminal 100, and executes an authentication of these information. In a case where the authentication of these information succeeds, the CPU 32 establishes the WFD connection with the mobile terminal 100. Thereby, the CPU 32 can cause the mobile terminal 100 to participate, as a CL (abbreviation of Client), in the WFD network in which the MFP 10 operates as G/O.

In S130, the CPU 32 monitors whether a user name and a password are received from the mobile terminal 100 by using the WFD connection. The user name and the password are received from the mobile terminal 100 due to the user name and the password being inputted to the mobile terminal 100.

In S133, the CPU 32 executes an authentication using the user name and the password received from the mobile terminal 100. Specifically, the CPU 32 determines whether the combination of the received user name and password has been registered in the user table 40. The CPU 32 determines that the authentication is successful in a case of determining that the combination has been registered, and determines that the authentication fails in a case of determining that the combination has not been registered. For example, it may be determined that the authentication fails in a case where the user inputs an erroneous combination of a user name and a password to the mobile terminal 100.

In S135, the CPU 32 determines whether the authentication of S133 was successful. The CPU 32 proceeds to S140 in a case of determining that the authentication was successful (YES in S135), and proceeds to S145 in a case of determining that the authentication failed (NO in S135).

In S140, the CPU 32 sends a registration instruction to the mobile terminal 100 by using the WFD connection. The registration instruction is an instruction for causing the mobile terminal 100 to register the user name and the password as authentication information to be authenticated by the MFP 10.

In S145, the CPU 32 sends a failure notification indicating that the authentication has failed to the mobile terminal 100 by using the WFD connection.

In S150, the CPU 32 determines whether a number of authentications, which is a number of times the authentication has been executed, matches a predetermined number. The predetermined number is a number of two or more times, and is determined in advance. The CPU 32 proceeds to S155 in a case where the number of authentications matches the predetermined number (YES in S150), and returns to S130 in a case where the number of authentications is less than the predetermined number (NO in S150).

In S155, the CPU 32 receives a disconnection request for requesting a disconnection of the WFD connection from the mobile terminal 100 by using the WFD connection, and disconnects the WFD connection with the mobile terminal 100. When S155 ends, the registration process of FIG. 3 ends.

In S160, the CPU 32 monitors whether a predetermined period has elapsed since the disconnection of the NFC session was detected in S115, without receiving the probe request from the mobile terminal 100. In a case where the predetermined period has elapsed (YES in S160), the CPU 32 ends the registration process of FIG. 3.

Figure 4:
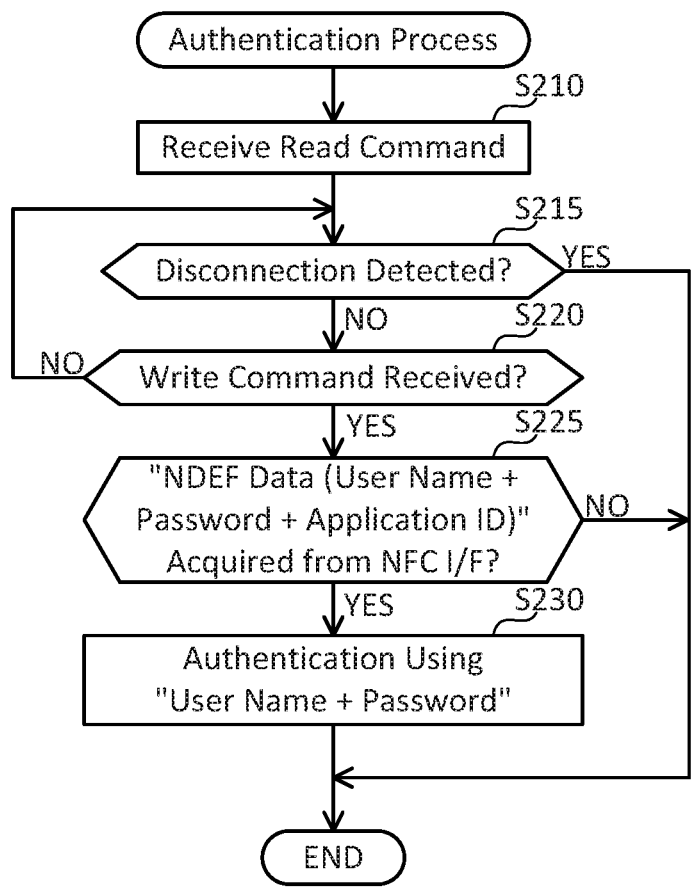
FIG. 4 shows a flowchart of an authentication process.

(Authentication Process; FIG. 4)

Next, the authentication process executed in S66 of FIG. 2 will be described with reference to FIG. 4. S210 is the same as S110 of FIG. 3.

In S215, the CPU 32 monitors whether the disconnection of the NFC session with the mobile terminal 100 is detected. In a case of acquiring information indicating that the NFC session has been disconnected from the NFC I/F 22, the CPU 32 determines YES in S215, and ends the authentication process of FIG. 4.

In S220, the CPU 32 monitors whether a write command is received from the mobile terminal 100 via the NFC I/F 22 by using the NFC session established in S60 of FIG. 2. The write command is a confirmation signal for confirming whether it is possible to execute writing of information (i.e., whether the NFC I/F 22 is capable of receiving information). The write command is sent from the mobile terminal 100 in a case where the user name and the password have been registered in the mobile terminal 100 (see S340 of FIG. 5 to be described later). In a case of receiving the write command from the mobile terminal 100, the NFC I/F 22 sends an OK command for the write command. In this case, the NFC I/F 22 supplies the write command to the controller 30. In a case of acquiring the write command from the NFC I/F 22, the CPU 32 determines YES in S220, and proceeds to S225.

In S225, the CPU 32 determines whether NDEF data including the user name, the password and an application ID of the authentication application 140 has been acquired from the NFC I/F 22. In the case where the OK signal for the write command is sent to the mobile terminal 100, the NFC I/F 22 acquires the NDEF data including the user name, the password, and the application ID from the mobile terminal 100. Here, the user name and the password included in the NDEF data are a user name and a password which were sent in the past from the MFP 10 to the mobile terminal 100, and registered in the mobile terminal 100. Further, the application ID included in the NDEF data is information for identifying an application currently running in the mobile terminal 100 (e.g., the authentication application 140). The NFC I/F 22 supplies the NDEF data including the user name, the password and the application ID to the controller 30. The CPU 32 determines whether the application ID acquired from the NFC I/F 22 matches the application ID (not shown) of the authentication application 140 stored in advance in the memory 34. The CPU 32 proceeds to S230 in a case of determining that the application ID acquired from the NFC I/F 22 and the application ID of the authentication application 140 match (YES in S225). On the other hand, the CPU 32 ends the authentication process of FIG. 4 in a case of determining that the acquired application ID and the application ID of the authentication application 140 do not match (NO in S225). For example, such an event can occur in a situation where, due to the mobile terminal 100 running an application different from the authentication application 140, an application ID of that application is received.

S230 is the same as S133 of FIG. 3. In a case of determining that the authentication is successful, the CPU 32 permits the use of the functions corresponding to the respective permission information associated with the acquired combination of the user name and the password. Specifically, in a case where the print permission information is "OK", the CPU 32 permits execution of printing. For example, when an operation for downloading print data from a server on the Internet is performed on the operation units 12, 14, the CPU 32 can receive the print data from the server, and cause the print executing unit 16 to execute printing of an image represented by the print data. Further, in a case where the scan permission information is "OK", the CPU 32 permits execution of scanning. For example, when a button for executing a scan is operated, the CPU 32 causes the scan executing unit 18 to scan a document. On the other hand, in the case of determining that the acquired combination of the user name and the password has not been registered in the user table 40, the CPU 32 determines that authentication fails. For example, such an event can occur in a case where the administrator of the MFP 10 has deleted the received user name and the password from the user table 40. When S230 ends, the authentication process of FIG. 4 ends.

Figure 5:
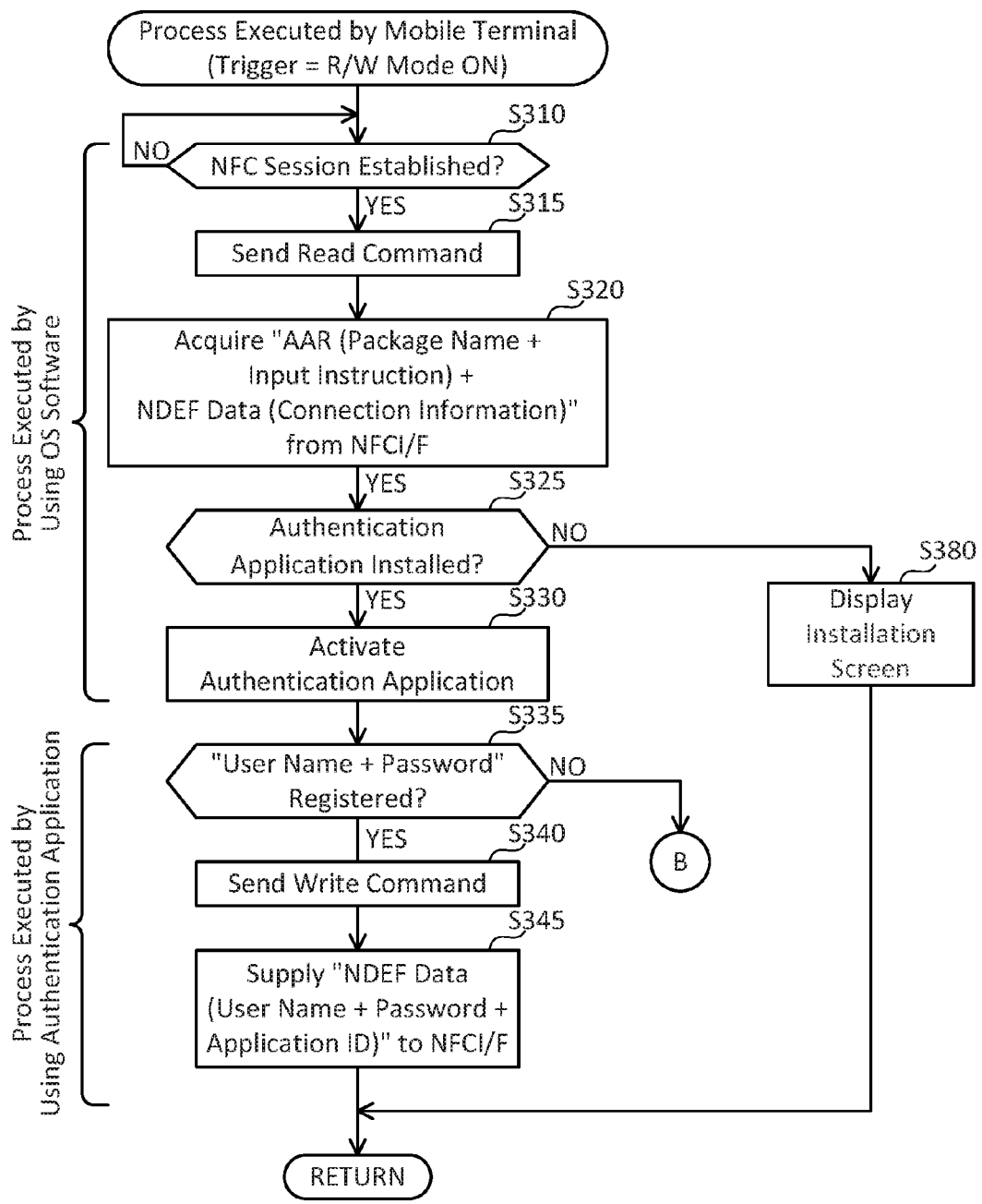
FIG. 5 shows a flowchart of a process executed by a mobile terminal.
Figure 6:
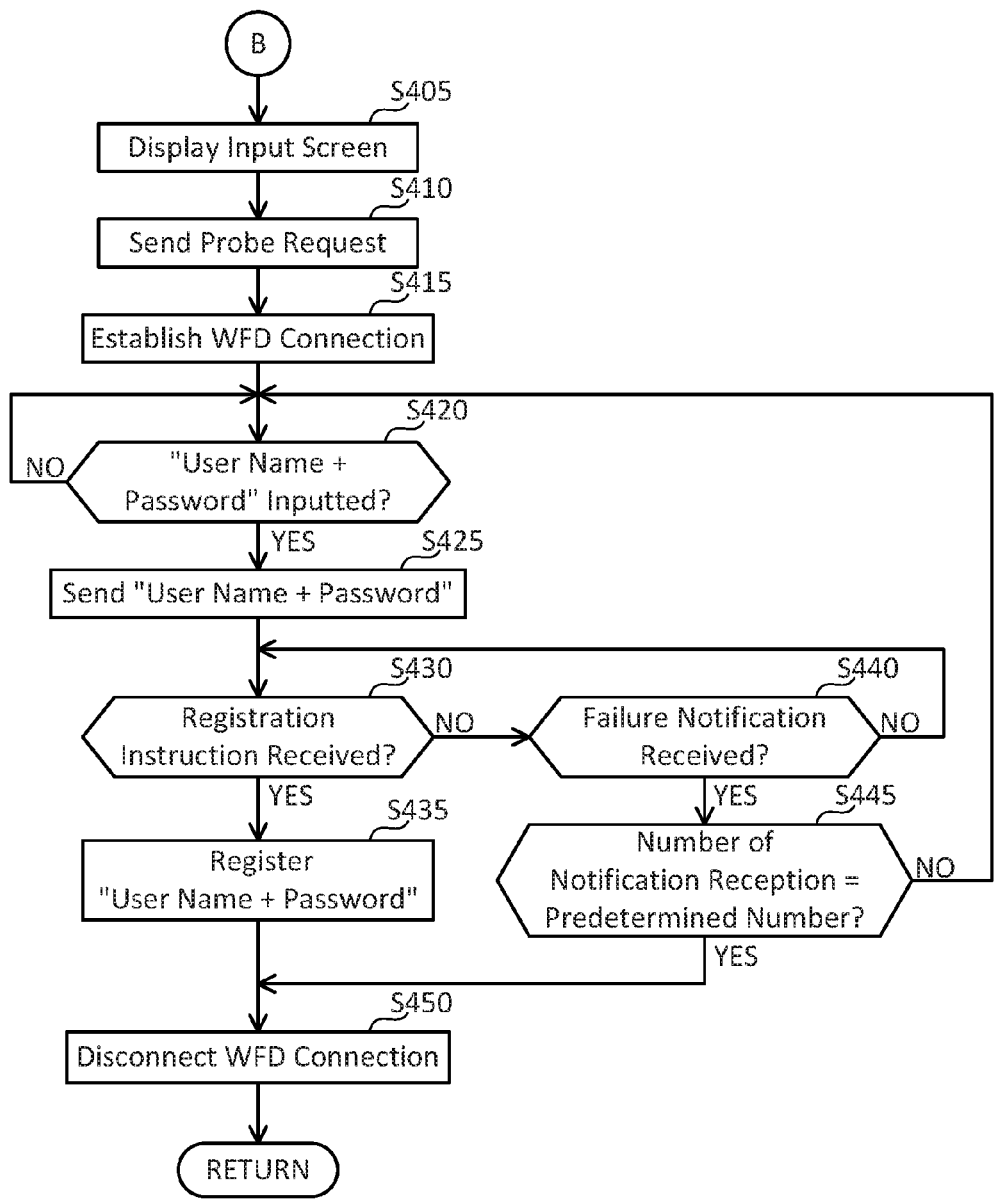
FIG. 6 shows a flowchart of a continuation of FIG. 5.

(Process Executed by Mobile Terminal; FIG. 5 and FIG. 6)

Next, a process executed by the CPU 132 of the mobile terminal 100 will be described with reference to FIG. 5 and FIG. 6. For example, when an operation for activating an operation of the NFC I/F 122 is executed on the operation units 112, 114, the NFC I/F 122 operates in the R/W mode. Thereby, the process of FIG. 5 is started. The CPU 132 executes S310 to S330, and S380 by using the OS software 138 (i.e., without using the authentication application 140), and executes S335 to S345 of FIG. 5, and S405 to S450 of FIG. 6 by using the authentication application 140.

In S310, the CPU 132 monitors whether the NFC I/F 122 establishes the NFC session with the MFP 10. In a case of acquiring information indicating that the NFC session has been established from the NFC I/F 122, the CPU 132 determines YES in S310, and proceeds to S315.

In S315, the CPU 132 sends the read command to the MFP 10 via the NFC I/F 122 by using the NFC session with the MFP 10 (see S110 of FIG. 3, S210 of FIG. 4). As a result, the NFC I/F 122 receives the OK command for the read command from the MFP 10, receives both the AAR including the package name 39 and the input instruction, and the NDEF data including the connection information 41 from the MFP 10 by using the NFC session, and supplies both the AAR and the NDEF data to the controller 130.

In S320, the CPU 132 acquires both the AAR and the NDEF data from the NFC I/F 122. Here, the CPU 132 stores both the AAR and the NDEF data in the volatile area 142 in the memory 134.

In S325, the CPU 132 determines whether the authentication application 140 has been installed. In a case where the authentication application 140 specified by the package name 39 in the AAR stored in the volatile area 142 in S320 has been installed (YES in S325), the CPU 132 proceeds to S330. On the other hand, in a case where the authentication application 140 has not been installed (NO in S325), the CPU 132 proceeds to S380.

In S380, the CPU 132 causes the display unit 114 to display an installation screen. The installation screen is a screen for installing the authentication application 140 specified by the package name 39. The CPU 132 installs the authentication application 140 in a case where an operation for installing the authentication application 140 is performed on the installation screen in the operation units 112, 114. When S380 ends, the process returns to S310.

In S330, the CPU 132 activates the authentication application 140. Thereby, the subsequent processes of S335 to S345 of FIG. 5, S405 to S450 of IFG. 6 are realized by the authentication application 140.

In S335, the CPU 132 determines whether the user name and the password have been registered in the non-volatile area 136 in the memory 134. In a case where the user name and the password have been registered in the non-volatile area 136 (YES in S335), the CPU 132 proceeds to S340. On the other hand, in a case where the user name and the password have not been registered in the non-volatile area 136 (NO in S335), the CPU 132 proceeds to S405 of FIG. 6.

In S340, the CPU 132 sends the write command to the MFP 10 via the NFC I/F 122 by using the NFC session with the MFP 10 (see S220 of FIG. 4). As a result, the NFC I/F 122 receives the OK command for the write command from the MFP 10.

In S345, the CPU 132 supplies, to the NFC I/F 122, the NDEF data including the user name and the password registered in the non-volatile area 136, and the application ID of the authentication application 140 stored in the non-volatile area 136. Thereby, by using the NFC session with the MFP 10, the NFC I/F 122 sends the NDEF data to the MFP 10, and can cause the MFP 10 to execute the authentication using the user name and the password in the NDEF data (see S230 of FIG. 4). When S345 ends, the process returns to S310.

In S405 of FIG. 6, the CPU 132 causes the display unit 114 to display the input screen in accordance with the input instruction acquired in S320 of FIG. 5. Since the input screen is displayed before the WFD connection is established (see S415), the user can input the user name and the password using a period in which a process for establishing the WFD connection is executed (see S410, S415).

In S410, the CPU 132 sends the probe request including the SSID in the connection information 41 acquired in S320 of FIG. 5 to the MFP 10 via the Wi-Fi I/F 120 (see S120 of FIG. 3).

In S415, the CPU 132 establishes the WFD connection with the MFP 10 via the Wi-Fi I/F 120 by using the connection information 41 acquired in S320 of FIG. 5 (see S125 of FIG. 3). Thereby, the mobile terminal 100 participates, as CL, in the WFD network in which the MFP 10 operates as G/O.

In S420, the CPU 132 monitors whether an input operation for inputting the user name and the password is executed on the operation units 112, 114. In a case where the input operation is executed (YES in S420), the CPU 132 proceeds to S425.

In S425, the CPU 132 sends the user name and the password inputted in S420 to the MFP 10 by using the WFD connection (see S130 of FIG. 3). Thereby, the CPU 132 can cause the MFP 10 to execute the authentication using the user name and the password (see S133 of FIG. 3).

In S430, the CPU 132 monitors whether the registration instruction is received from the MFP 10 by using the WFD connection (see S140 of FIG. 3). In a case of receiving the registration instruction from the MFP 10 (YES in S430), the CPU 132 proceeds to S435.

In S435, in accordance with the registration instruction, the CPU 132 registers the user name and the password, which were inputted in S420, in the non-volatile area 136 in the memory 134 as the authentication information to be authenticated by the MFP 10. When S435 ends, the process proceeds to S450.

In S440, the CPU 132 monitors whether the failure notification is received from the MFP 10 by using the WFD connection (see S145 of FIG. 3). In a case of receiving the failure notification from the MFP 10 (YES in S440), the CPU 132 proceeds to S445.

In S445, the CPU 132 determines whether a number of notification receptions, which is a number of times the failure notification has been received, matches a predetermined number. Specifically, in a case where the number of notification receptions matches the predetermined number, the CPU 132 determines YES in S445, and proceeds to S450. On the other hand, in a case where the number of notification receptions is less than the predetermined number, the CPU 132 determines NO in S445, and returns to S420. In this case, the CPU 132 causes the display unit 114 to display the input screen again together with a message prompting a re-input of the user name and the password.

In S450, the CPU 132 sends the disconnection request to the MFP 10 by using the WFD connection, and disconnects the WFD connection with the MFP 10. When S450 ends, the process returns to S310 of FIG. 5.

As aforementioned, depending on whether or not the user name and the password have been registered in the mobile terminal 100 (S335), the CPU 132 can appropriately cause the MFP 10 to execute the authentication using the user name and the password which have been registered in the non-volatile area 136, or the authentication using the user name and the password inputted in S420 (S345, S425). Further, in the case where the authentication using the user name and the password inputted in S420 succeeds (YES in S430), the CPU 132 can appropriately register the user name and the password (S435).

(Specific Cases)

Figure 7:
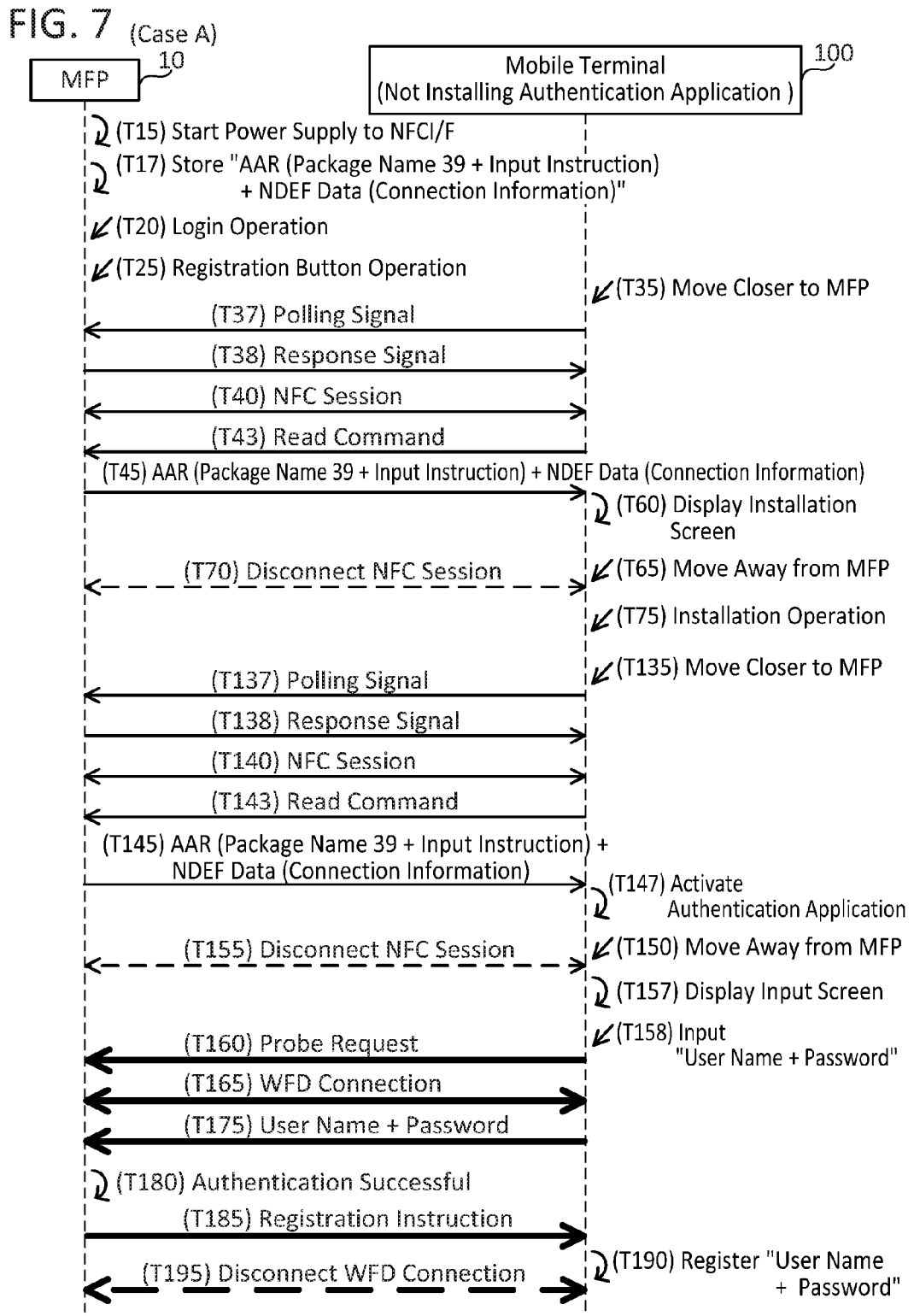
FIG. 7 shows a sequence diagram of a case A in which a user name and a password are registered in the mobile terminal.
Figure 8:
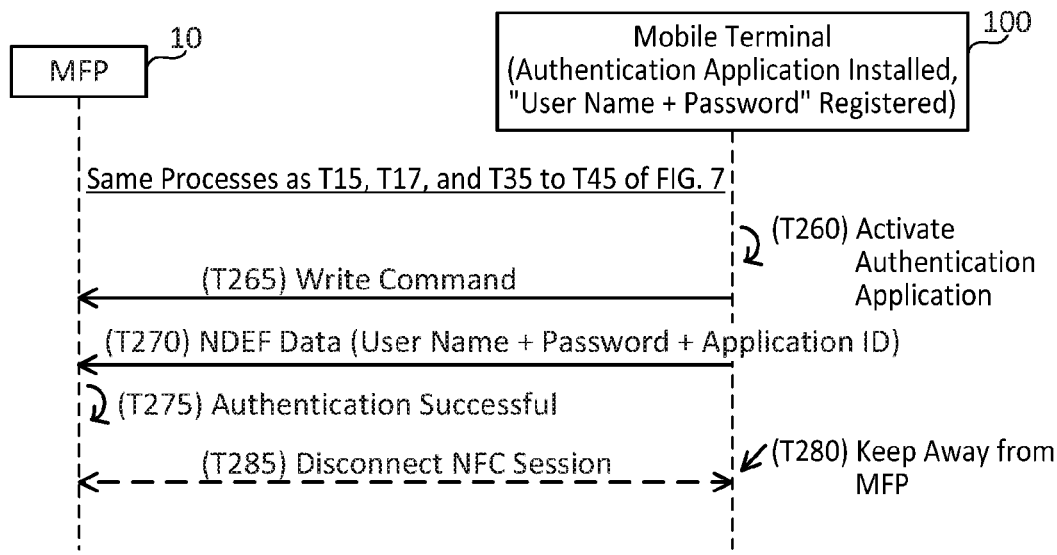
FIG. 8 shows a sequence diagram of a case B in which an authentication is executed.
Figure 9:
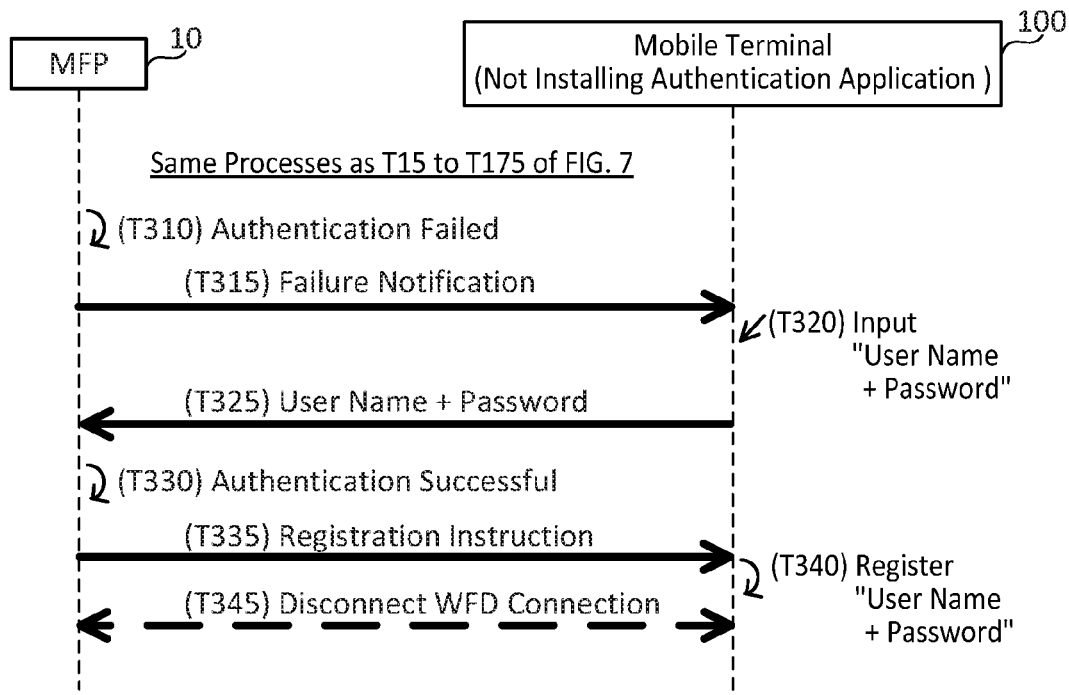
FIG. 9 shows a sequence diagram of a case C in which an authentication is re-tried.

Next, specific cases A to C realized by the processes of FIG. 2 to FIG. 6 will be described with reference to FIG. 7 to FIG. 9. In an initial status of each of the cases A to C, authentication mode of the MFP 10 is set to ON, and the NFC I/F 122 of the mobile terminal 100 is operating in the R/W mode. In FIG. 7 to FIG. 9, thin arrows and thick arrows between the MFP 10 and the mobile terminal 100 indicate NFC communication and Wi-Fi communication, respectively.

(Case A; FIG. 7)

In the initial status of the case A of FIG. 7, the authentication application 140 is not installed in the mobile terminal 100. In T15, the MFP 10 starts the power supply to the NFC I/F 22 (S10 of FIG. 2), and in T17, stores both the AAR including the package name 39 and the input instruction, and the NDEF data including the connection information 41 in the memory 24 in the NFC I/F 22 (S15).

In T20, the user performs the login operation in the MFP 10 (YES in S20 of FIG. 2), and in T25, operates the registration button (YES in S30). Then, in T35, the user moves the mobile terminal 100 closer to the MFP 10.

In T37, the MFP 10 receives the polling signal from the mobile terminal 100, and in T38, sends the response signal to the mobile terminal 100 (YES in S40 of FIG. 2). As a result, in T40, the NFC session is established between the MFP 10 and the mobile terminal 100.

In T43, the MFP 10 receives the read command from the mobile terminal 100 by using the NFC session established in T40 (S110 of FIG. 3), and sends the OK command to the mobile terminal 100 by using the NFC session. Then, in T45, the MFP 10 sends both the AAR including the package name 39 and the input instruction, and the NDEF data including the connection information 41 to the mobile terminal 100 by using the NFC session.

Upon receiving the AAR and the NDEF data from the MFP 10 by using the NFC session (S320 of FIG. 5), since the authentication application 140 has not been installed (NO in S325), in T60, the mobile terminal 100 displays the installation screen (S380).

In T65, the user moves the mobile terminal 100 away from the MFP 10. Thereby, in T70, the NFC session between the mobile terminal 100 and the MFP 10 is disconnected (S115 of FIG. 3). In T75, the user performs the installation operation in the mobile terminal 100. Thereby, the authentication application 140 is installed in the mobile terminal 100.

T135 to T145, which are executed thereafter, are the same as T35 to T45. Since the authentication application 140 has been installed (YES in S325 of FIG. 5), in T147, the mobile terminal 100 activates the authentication application 140 (S330). T150, T155 are the same as T65, 70.

Since the user name and the password have not been registered (NO in S335 of FIG. 5), in T157, the mobile terminal 100 displays the input screen (S405 of FIG. 6). In T158, the user performs the input operation in the mobile terminal 100. In T160, the mobile terminal 100 sends the probe request to the MFP 10 (S410).

The MFP 10 receives the probe request from the mobile terminal 100 (YES in S120 of FIG. 3) and, in T165, establishes the WFD connection with the mobile terminal 100 (S125).

Since the input operation has been performed (YES in S420 of FIG. 6), in T175, the mobile terminal 100 sends the user name and the password to the MFP 10 by using the WFD connection (S425).

The MFP 10 receives the user name and the password from the mobile terminal 100 by using the WFD connection (YES in S130 of FIG. 3), and in T180, executes the authentication using the user name and the password (S133) and the authentication succeeds (YES in S135). In T185, the MFP 10 sends the registration instruction to the mobile terminal 100 by using the WFD connection (S140).

The mobile terminal 100 receives the registration instruction from the MFP 10 by using the WFD connection (YES in S430 of FIG. 6), registers the user name and the password in the non-volatile area 136 in T190 (S435) and, disconnects the WFD connection with the MFP 10 in T195 (S450).

(Effect of Case A)

In the present case, the MFP 10 establishes the WFD connection with the mobile terminal 100 via the Wi-Fi I/F 20 (T165) by using the connection information 41 sent to the mobile terminal 100 via the NFC I/F 22. Then, the MFP 10 executes the authentication using the user name and the password received from the mobile terminal 100 by using the WFD connection and, and when the authentication succeeds (T180), sends the registration instruction to the mobile terminal 100 by using the WFD connection (T185). As a result, the user name and the password are registered in the mobile terminal 100 (T190). As aforementioned, the communication of the user name and the password is executed via the Wi-Fi I/F 20. Consequently, even without maintaining the NFC session via the NFC I/F 22 (i.e., even if the distance between the MFP 10 and the mobile terminal 100 increases), the MFP 10 can cause the user name and the password to be registered appropriately in the mobile terminal 100 by sending the registration instruction to the mobile terminal 100 via the Wi-Fi I/F 20.

(Case B; FIG. 8)

Case B of FIG. 8 is a case executed after the case A. Firstly, the same processes as T15, T17, T35 to T45 of FIG. 7 are executed. T260 is the same as T147 of FIG. 7.

Since the user name and the password have been registered (YES in S335 of FIG. 5), in T265, the mobile terminal 100 sends the write command to the MFP 10 by using the NFC session (S340). In T270, the mobile terminal 100 sends the NDEF data including the user name, the password and the application ID of the authentication application 140 to the MFP 10 by using the NFC session (S345).

The MFP 10 receives the NDEF data from the mobile terminal 100 by using the NFC session, and in T275, executes the authentication using the user name and the password. Since the combination of the user name and the password has been registered in the user table 40, the authentication is successful. Thereby, the MFP 10 permits the use of the functions corresponding to the respective permission information associated with the combination of the user name and the password. T280, T285 are the same as T65, T70 of FIG. 7. In the present case, even without the user inputting the user name and the password to the mobile terminal 100, the MFP 10 receives the user name and the password registered in the mobile terminal 100 from the mobile terminal 100 (T270), and can execute the authentication using the user name and the password (T275). For this reason, an operation load of the user can be reduced.

Further, if a configuration is adopted in which the user name and the password are communicated by using the WFD connection instead of the NFC communication of T265 and T270, the WFD connection needs to be established. However, since the user name and the password are sent by the NFC communication of T265 and T270 in the present case, the WFD connection is not needed to be established, as a result of which the user name and the password can be sent rapidly to the MFP 10.

(Case C; FIG. 9)

The initial status of the case C of FIG. 9 is the same as the initial status of the case A of FIG. 7. Firstly, the same processes as T15 to T175 of FIG. 7 are executed.

In T310, the MFP 10 executes the authentication using the user name and the password (S133), however, the authentication fails (NO in S135) due to the erroneous combination of the user name and the password having been inputted to the mobile terminal 100. In T315, the MFP 10 sends the failure notification to the mobile terminal 100 by using the WFD connection (S145).

The mobile terminal 100 receives the failure notification from the MFP 10 by using the WFD connection (YES in S440 of FIG. 6). In T320, the user inputs the correct combination of the user name and the password to the mobile terminal 100. T325 to T345 are the same as T175 to T195 of FIG. 7. When the mobile terminal 100 is moved closer to the MFP 10 after the user name and the password have been registered in the mobile terminal 100 in the case C, the processes of the case B are executed. Even though the user inputs the erroneous combination of the user name and the password to the mobile terminal 100, by inputting the correct combination of the user name and the password to the mobile terminal 100 (T320), the MFP 10 can be caused to execute the authentication using the user name and the password (T330).

(Correspondence Relationships)

The MFP 10 and the mobile terminal 100 are an example of "communication device" and "terminal device", respectively. The memory 24 is an example of "interface memory". The NFC I/F 22 and the Wi-Fi I/F 20 are an example of "first wireless interface" and "second wireless interface" of "communication device", respectively. The NFC I/F 122 and the Wi-Fi I/F 120 are an example of "first wireless interface" and "second wireless interface" of "terminal device", respectively. The WFD connection is an example of "wireless connection". The user name and the password are an example of "first authentication information" and "second authentication information", respectively. The authentication application 140 is an example of "specific application program". The AAR is an example of "activation instruction".

(Modification 1)

The connection information 41 may be a MAC address of the MFP 10. In this case, the CPU 32 of the MFP 10 establishes the WFD connection with the mobile terminal 100 (S125) by receiving a connection request including the MAC address from the mobile terminal 100 (YES in S120), and executing communications of various signals with the mobile terminal 100. It should be noted, during the communications of the various signals being executed, the CPU 32 sends the SSID, the authentication method, the encryption method, and the password to the mobile terminal 100. That is, "connection information" may be, e.g., a MAC address of the communication device.

(Modification 2)

In S15, the CPU 32 of the MFP 10 may supply the AAR to the NFC I/F 22, but may not store the AAR in the memory 24. That is, the NFC I/F 22 may not send the AAR to the mobile terminal 100. In this case, the user needs to perform, in advance, the installation operation and an activation operation for activating the authentication application 140 on the mobile terminal 100. Further, in another modification, in S15, the CPU 32 may supply the package name 39, instead of the AAR including the package name 39, to the NFC I/F 22, and may store the package name 39 in the memory 24. In this case, the user needs to perform, in advance, the activation operation on the mobile terminal 100 after the authentication application 140 has been installed. That is, "supply an activation instruction" supplies the activation instruction to the first wireless interface, but may not store the activation instruction in the interface memory.

(Modification 3)

The CPU 32 of the MFP 10 may execute S120, S125 of FIG. 3, instead of S220, S225 of FIG. 4 (i.e., the CPU 32 may receive the user name and the password by using the WFD connection). Further, after executing S410, S415 of FIG. 6, instead of S340, S345 of FIG. 5, the CPU 132 of the mobile terminal 100 may send the user name and the password registered in the volatile area 142 by using the WFD connection. In another modification, each of the MFP 10 and the mobile terminal 100 may further comprise an I/F for executing a wireless communication in accordance with the Bluetooth method, and the CPU 32 of the MFP 10 may establish a wireless connection in accordance with the Bluetooth method, instead of S220, S225 of FIG. 4, and receive the user name and the password by using this wireless connection. That is, "first authentication information which has been registered in the terminal device" may not be received via the first interface.

(Modification 4)

The CPU 32 of the MFP 10 may skip S150 of FIG. 3, and proceed to S155. Further, the CPU 132 of the mobile terminal 100 may skip S445 of FIG. 6, and proceed to S450. That is, "execute a third authentication using second authentication information different from the first authentication information" may not execute an authentication using the second authentication information, and "send a second registration instruction to the terminal device" may not send the second registration instruction to the terminal device.

(Modification 5)

The print permission information and the scan permission information may not be registered in the user table 40, and the CPU 32 of the MFP 10 may permit printing and scanning to be executed in the case of determining that the authentication is successful in S230 of FIG. 4. Further, in the present modification, setting information indicating a default setting of the MFP 10 may be inputted to the MFP 10 by the administrator of the MFP 10, and may be registered in the user table 40 in association with the combination of the user name and the password. In the case of determining that the authentication is successful in S230, the CPU 32 may set the setting information associated with the acquired combination of the user name and the password in the MFP 10. It should be noted that the setting information includes a print setting (paper size, color, and the like), a scan setting (paper size, resolution, and the like), and the like.

(Modification 6)

In the above embodiment, the NFC I/F 22 is an NFC tag, but in a modification, it may be an NFC forum device. In this case, when a communication of each information is executed, the NFC I/F 22 may operate in the CE mode and the NFC I/F 122 may operate in the R/W mode, the NFC I/F 22 may operate in the R/W mode and the NFC I/F 122 may operate in the CE mode, and both the NFC I/Fs 22 and 122 may operate in the P2P mode. It should be noted, for the modification in which the NFC I/F 122 operates in the CE mode, the NFC I/F 122 may be an NFC tag.

(Modification 7)

"First wireless interface" of "communication device" may not be an I/F for executing an NFC communication, but may be, e.g., an I/F for executing a wireless communication in accordance with another communication system such as Bluetooth (registered trademark), TransferJet (registered trademark), an infrared communication, or the like. Similarly, "first wireless interface" of "terminal device" may be an I/F for executing a wireless communication in accordance with another communication system such as Bluetooth, TransferJet, infrared communication, or the like.

(Modification 8)

"Second wireless interface" of "communication device" may be, e.g., an I/F for executing a wireless communication in accordance with the Bluetooth method. Similarly, "second wireless interface" of "terminal device" may be, e.g., an I/F for executing a wireless communication in accordance with the Bluetooth method. In this case, the connection information 41 is information for establishing a wireless connection in accordance with the Bluetooth method with another device (e.g., the mobile terminal 100), and includes a pairing key and the like. Generally speaking, a distance with which a wireless communication can be executed via "second wireless interface" may be any distance longer than a distance with which a wireless communication can be executed via "first wireless interface".

(Modification 9)

"Communication device" may not be the MFP 10 capable of executing a plurality of functions, but may be a printer capable of executing only a printing function, a scanner capable of executing only a scanning function, or the like. Further, "communication device" may be a PC, a server, a mobile terminal, or the like.

(Modification 10)

In the above embodiment, the CPU 32 of the MFP 10 implements each of the processes of FIG. 2 to FIG. 4 by executing the program 36 (i.e., software). Instead, at least one of the processes of FIG. 2 to FIG. 4 may be implemented by hardware such as a logic circuit or the like.

What is claimed is:

1. A communication device comprising:
a first wireless interface comprising an interface memory;
a second wireless interface different from the first wireless interface, wherein a distance with which a wireless communication can be performed via the second wireless interface is longer than a distance with which a wireless communication can be performed via the first wireless interface;
a processor; and
a memory storing computer-readable instructions therein, the computer-readable instructions, when executed by the processor, causing the communication device to:
supply connection information to the first wireless interface so as to store the connection information in the interface memory, the connection information being for establishing a wireless connection via the second wireless interface, wherein the first wireless interface is configured to send the connection information in the interface memory to a terminal device by using a communication session in a case where the communication session with the terminal device is established;
establish the wireless connection via the second wireless interface with the terminal device by using the connection information after the connection information has been sent to the terminal device;
execute a first authentication using first authentication information in a case where the first authentication information is received from the terminal device by using the wireless connection via the second wireless interface due to the wireless connection via the second wireless interface being established and the first authentication information being inputted to the terminal device;
send a first registration instruction to the terminal device by using the wireless connection via the second wireless interface in a case where the first authentication using the first authentication information is successful, the first registration instruction being for registering the first authentication information in the terminal device as authentication information which is to be used by the communication device to execute an authentication;
execute a second authentication using the first authentication information in a case where the first authentication information which has been registered in the terminal device is received from the terminal device after the first registration instruction has been sent to the terminal device;
execute a third authentication using second authentication information different from the first authentication information in a case where the second authentication information is received from the terminal device by using the wireless connection via the second wireless interface due to the second authentication information being inputted to the terminal device after the first authentication using the first authentication information has failed;
send a second registration instruction to the terminal device by using the wireless connection via the second wireless interface in a case where the third authentication using the second authentication information is successful, the second registration instruction being for registering the second authentication information in the terminal device as authentication information which is to be used by the communication device to execute an authentication; and
execute a fourth authentication using the second authentication information in a case where the second authentication information which has been registered in the terminal device is received from the terminal device after the second registration instruction has been sent to the terminal device.

2. The communication device as in claim 1, wherein
the computer-readable instructions, when executed by the processor, further cause the communication device to:
supply an activation instruction to the first wireless interface so as to store the activation instruction in the interface memory, the activation instruction being for activating a specific application program which has been installed in the terminal device,
wherein the first wireless interface is configured to send the connection information and the activation instruction in the interface memory to the terminal device by using the communication session, in the case where the communication session with the terminal device is established, and
the specific application program is for establishing the wireless connection via the second wireless interface with the communication device and for sending the first authentication information to the communication device by using the wireless connection.

3. The communication device as in claim 1, wherein
the second authentication using the first authentication information is executed in a case where the first authentication information which has been registered in the terminal device is received from the terminal device via the first wireless interface after the first registration instruction has been sent to the terminal device.

4. The communication device as in claim 1, wherein
the first wireless interface is for performing a communication according to NFC (abbreviation of Near Field Communication) standard.

5. A non-transitory computer-readable recording medium storing computer-readable instructions for a terminal device,
wherein the computer-readable instructions, when executed by a processor of the terminal device, cause the terminal device to:
determine whether first authentication information which is to be used by a communication device to execute an authentication is registered in the terminal device, in a case where a communication session with the communication device is established via a first wireless interface of the terminal device;
send the first authentication information to the communication device via the first wireless interface so as to cause the communication device to execute an authentication using the first authentication information, in a case where it is determined that the first authentication information is registered in the terminal device;
establish a wireless connection with the communication device via a second wireless interface of the terminal device, in a case where it is determined that the first authentication information is not registered in the terminal device, a distance with which a wireless communication can be performed via the second wireless interface being longer than a distance with which a wireless communication can be performed via the first wireless interface;
send second authentication information to the communication device by using the wireless connection via the second wireless interface so as to cause the communication device to execute an authentication using the second authentication information, in a case where the wireless connection via the second wireless interface is established and the second authentication information is inputted to the terminal device;
receive a registration instruction by using the wireless connection via the second wireless interface from the communication device in a case where the authentication using the second authentication information is successful; and
register the second authentication information as authentication information which is to be used by the communication device to execute an authentication, in a case where the registration instruction is received from the communication device.

6. The non-transitory computer-readable recording medium as in claim 5, wherein
the computer-readable instructions, when executed by the processor, further cause the terminal device to:
cause a display unit of the terminal device to display an input screen for inputting the second authentication information before the wireless connection via the second wireless interface is established in the case where it is determined that the first authentication information is not registered.

7. A non-transitory computer-readable recording medium storing computer-readable instructions for a communication device,
wherein the computer-readable instructions, when executed by a processor of the communication device, cause the communication device to:
supply connection information to a first wireless interface and cause the first wireless interface to store the connection information in the interface memory, the connection information being for establishing a wireless connection via a second wireless interface, the first wireless interface comprising an interface memory, the second wireless interface different from the first wireless interface, wherein a distance with which a wireless communication can be performed via the second wireless interface is longer than a distance with which a wireless communication can be performed via the first wireless interface, wherein the first wireless interface is configured to send the connection information in the interface memory to a terminal device by using a communication session in a case where the communication session with the terminal device is established;

establish the wireless connection via the second wireless interface with the terminal device by using the connection information after the connection information has been sent to the terminal device;

execute a first authentication using first authentication information in a case where the first authentication information is received from the terminal device by using the wireless connection via the second wireless interface due to the wireless connection via the second wireless interface being established and the first authentication information being inputted to the terminal device;

send a first registration instruction to the terminal device by using the wireless connection via the second wireless interface in a case where the first authentication using the first authentication information is successful, the first registration instruction being for registering the first authentication information in the terminal device as authentication information which is to be used by the communication device to execute an authentication;

execute a second authentication using the first authentication information in a case where the first authentication information which has been registered in the terminal device is received from the terminal device after the first registration instruction has been sent to the terminal device;

execute a third authentication using second authentication information different from the first authentication information in a case where the second authentication information is received from the terminal device by using the wireless connection via the second wireless interface due to the second authentication information being inputted to the terminal device after the first authentication using the first authentication information has failed;

send a second registration instruction to the terminal device by using the wireless connection via the second wireless interface in a case where the third authentication using the second authentication information is successful, the second registration instruction being for registering the second authentication information in the terminal device as authentication information which is to be used by the communication device to execute an authentication; and execute a fourth authentication using the second authentication information in a case where the second authentication information which has been registered in the terminal device is received from the terminal device after the second registration instruction has been sent to the terminal device.

* * * * *